(12) United States Patent
Gross

(10) Patent No.: US 8,306,478 B2
(45) Date of Patent: *Nov. 6, 2012

(54) REMOTE MONITORING DEVICE AND PROCESS

(75) Inventor: John Nicholas Gross, Berkeley, CA (US)

(73) Assignee: John Nicholas and Kristin Gross, Trust U/A/D/ April 13, 2010

(*) Notice: Subject to any disclaimer, the term of this patent is extended or adjusted under 35 U.S.C. 154(b) by 0 days.

This patent is subject to a terminal disclaimer.

(21) Appl. No.: 13/285,994

(22) Filed: Oct. 31, 2011

(65) Prior Publication Data

US 2012/0046073 A1    Feb. 23, 2012

Related U.S. Application Data

(63) Continuation of application No. 12/911,454, filed on Oct. 25, 2010, now Pat. No. 8,050,632, and a continuation of application No. 12/911,157, filed on Oct. 25, 2010, now Pat. No. 8,050,631, said application No. 12/911,454 is a continuation of application No. 11/849,137, filed on Aug. 31, 2007, now Pat. No. 7,822,387, said application No. 12/911,157 is a continuation of application No. 11/849,137, which is a continuation of application No. 10/863,744, filed on Jun. 7, 2004, now Pat. No. 7,266,347.

(60) Provisional application No. 60/477,541, filed on Jun. 10, 2003.

(51) Int. Cl.
*H04B 17/00* (2006.01)

(52) U.S. Cl. ............... 455/67.11; 455/41.2; 455/67.12; 340/3.1; 340/573.1

(58) Field of Classification Search ............... 455/41.2, 455/67.11, 67.12, 414.1, 422.1; 340/3.1, 340/573.1, 539.1, 539.11, 539.15, 539.16, 340/539.17, 539.22, 539.26

See application file for complete search history.

(56) References Cited

U.S. PATENT DOCUMENTS

| | | |
|---|---|---|
| 4,571,455 A | 2/1986 | Labock et al. |
| 5,640,147 A | 6/1997 | Chek |
| 5,651,070 A | 7/1997 | Blunt |
| 6,091,329 A | 7/2000 | Newman |
| 6,192,257 B1 * | 2/2001 | Ray ............................ 455/566 |
| 6,593,851 B1 * | 7/2003 | Bornstein ............... 340/539.15 |

(Continued)

FOREIGN PATENT DOCUMENTS

JP    09-16879    1/1997

OTHER PUBLICATIONS

Brain, Marshall, "How does the walkie-talkie feature on a Nextel phone work?" http://www.howstuffworks.com/question530.htm, viewed on Jun. 23, 2003, 2 pages.

(Continued)

*Primary Examiner* — Tuan H Nguyen
(74) *Attorney, Agent, or Firm* — J. Nicholas Gross

(57) ABSTRACT

A remote monitoring device is integrated as part of a cell phone or personal digital assistant. By sharing computing resources of a communications transceiver, the cost of a monitoring device can be significantly reduced, while still permitting sufficient functionality to effectively observe an area of interest, such as a child's sleeping area. An alert is generated and transmitted to an observer using a separate transceiver when activity at the monitored area (i.e., sound or video activity) meets a specified threshold.

30 Claims, 3 Drawing Sheets

U.S. PATENT DOCUMENTS

| | | |
|---|---|---|
| 6,759,956 B2 | 7/2004 | Menard et al. |
| 7,009,520 B2 | 3/2006 | Thompson |
| 2002/0021231 A1 | 2/2002 | Schlager et al. |
| 2002/0028696 A1 | 3/2002 | Hirayama et al. |
| 2002/0101350 A1 | 8/2002 | Thompson |
| 2002/0169614 A1 | 11/2002 | Fitzpatrick et al. |
| 2003/0067391 A1 | 4/2003 | Fitzgerald |
| 2003/0096580 A1 | 5/2003 | Kaplan |
| 2003/0098793 A1 | 5/2003 | Christ et al. |
| 2003/0122676 A1 | 7/2003 | Cuijpers |
| 2003/0191689 A1 | 10/2003 | Bosarge et al. |
| 2004/0001439 A1 | 1/2004 | Jones |
| 2004/0029557 A1 | 2/2004 | Pugliese |

OTHER PUBLICATIONS

Brewin, Bob, "Here comes the walkie-talkie cell phone," http://www.computerworld.com/mobiletopics/mobile/story/0,10801,78621,00.html, Feb. 18, 3003, 2 pages.

Buy.com, Description and Technical Specs for "HP iPAQ Pocket PC H5450—RAM: 64 MB ROM: 48 MB—Pocket PC 2002—display 3.8" TFT," http://www.buy.com/retail/product.asp?sku=10335358&loc=101, viewed on Jun. 24, 2003, 4 pages.

Kim, Jang Soo, "TattleTrail: An Archiving Voice Chat System for Mobile Users Over Internet Protocol," Thesis for Master of Engineering in Electrical Engineering and Computer Science, Massachusetts Institute of Technology, Jun. 2002, 76 pages.

Lee, Kwan et al.,"Impromptu," Speech Interface Group—Project Impromptu, http://www.media.mit.edu/speech/projects/impromptu.html, viewed on Jun. 23, 2003, site last updated on Sep. 19, 2001, 1 page.

Lee, Kwan Hong, "IMPromptU," Speech Interface Group, MIT Media Lab, Powerpoint presentation created on May 11, 2003, 23 pages.

Lee, Kwan Hong, "IMPromptU," Speech Interface Group, MIT Media Lab, Powerpoint presentation created on May 11, 2003, 9 pages.

Lee, K., Impromptu: Audio applications for mobile IP. Master's thesis, Massachusetts Institute of Technology, Sep. 2001, 90 pages.

Palowireless, "IEEE 802.11 Development Tools," http://203.147.194.107/i802_11/devtools.asp viewed on Jun. 24, 2003, 4 pages.

Pappalardo, Denise, "Nextel extends walkie-talkie Feature," http://www.networkworldfusion.com/news/2003/0609nextel.html, Jun. 9, 2003, 5 pages.

Schmandt et al., "Mediated voice communication via mobile IP," Proceedings of the ACM Symposium on User Interface Software and Technology (UIST 2002), Nov. 2002, pp. 141-150.

Vallejo, Gerardo et al., "CryBaby," Speech Interface Group—Project CryBaby, http://www.media.mit.edu/speech/projects/crybaby.html viewed on Jun. 23, 2003, site last updated on Oct. 26, 2001, 1 page.

Schmandt, C. and Vallejo, G. ""Listenin" to Domestic Environments From Remote Locations", Believed to be published in Proceedings of the International Conference on Auditory Display ICAD 2003, Boston, Jul. 6-9, 2003, 4 pages.

Schmandt, C. et al., "Impromptu: Managing Networked Audio Applications for Mobile Users." Believed to be published in Proceedings of MobiSys 2004 (Second International Conference on Mobile Systems, Applications, and Services), Jun. 2004, 11 pages.

Kidd, C. et al., "Building a Better Intercom: Context-Mediated Communication within the Home," GVU Technical Report 00-27, Georgia Institute of Technology College of Computing, Atlanta, GA, USA, 2000, 8 pages.

\* cited by examiner

REMOTE MONITORING DEVICE AND PROCESS

RELATED APPLICATION DATA

The present application claims the benefit under 35 U.S.C. 119(e) of the priority date of Provisional Application Ser. No. 60/477,541 filed Jun. 10, 2003, which is hereby incorporated by reference.

FIELD OF THE INVENTION

The present invention relates to devices and methods for remote monitoring, and has particular applicability to systems which are used in child monitors.

BACKGROUND

Baby monitors are well-known in the art. Examples of the same can be seen in U.S. Pat. No. 6,091,329: Monitor/Hands Free Intercom; U.S. Pat. No. 6,593,851; U.S. Patent Publication No. US20030122676A1; U.S. Patent Publication No. US20030067391A1: Two-way communication baby monitor with a soothing unit; US Patent Publication No. 20020101350: Method, Apparatus and System for Remote Baby Monitoring With Additional Functions, and World Application No. WO0241489A2: AUTOMATIC MUTE BY BABY MONITOR, all of which are hereby incorporated by reference. Most of these systems work using an RF based transmitter and receiver to allow a more convenient wireless setup. A limitation of these systems is the fact that they are limited in range, cannot be used in some environments where the signal may be blocked, and are susceptible to interference from conventional portable phone signals and similar appliances.

A more recent innovation by Logitech identified as "Mobile Video" allows a camera (which can be a form of baby monitoring device) to transmit monitoring information across a communications channel that can then be seen on a cellular phone. This allows for a greater range of operation. More information on such product can be obtained from the manufacturer of such product, and at their website (Logitech.com)

Another product offering by Cenuco, entitled "Mommytrack" is a baby monitor that allows remote viewing from a PDA device. The MommyTrack "package" includes a mobile device; two home cameras; a wireless base station that connects to a USB port; gateway server access; and special software for both the home PC and the mobile handheld. While the system is relatively sophisticated, it costs thousands of dollars in additional equipment costs. Moreover, a separate subscription is required. More information on such product can be obtained from the manufacturer of such product, and at their website (Cenuco.com).

One limitation of such prior art devices include the fact that a separate dedicated input capture device must be used as part of the transmitting portion of the system. In other words, a specialized sound/video receiver must monitor the area of interest, and then transmit the information to a separate receiver. While the aforementioned Logitech approach solves half the problem (i.e., by allowing a conventional cell phone to pick up the monitored signal) it does not completely eliminate the problem of having to invest in additional hardware for a baby monitoring application.

A recent U.S. Application to Kaplan—2003/0096580—published May 22, 2003 describes using a conventional mobile phone to function as a remote monitoring device. A stimulus (such as video or audio) can trigger a phone call from a monitoring area to a remote user. A sound compare circuit is used to determine that the stimulus is indeed an event that should be reported. The Kaplan reference further comments on the low power, short range limitations of a conventional FM based baby monitor. To address such limitation, Kaplan proposes using a higher powered RF transmitter, such as in a mobile phone. Notably, however, Kaplan does not make mention of routing the stimulus data over anything other than a conventional wireless base station, such as a non-full duplex, or low bandwidth secondary communications channel; nor does he mention allowing the user to journal or calibrate the monitoring link to allow for variations environments, or for the option of transmitting additional information along with the stimulus event.

SUMMARY OF THE INVENTION

An object of the present invention, therefore, is to overcome the aforementioned limitations of the prior art;

Another object is to provide a system and method for monitoring an area, such as a children's sleeping location, using a conventional cell phone (or PDA);

A related object is to provide a cell phone or PDA with integrated monitoring functionality, to reduce a cost associated with a remote monitoring activity.

A first aspect of the invention concerns a wireless communications transceiver which includes an integrated monitoring circuit and comprising: a setup circuit for configuring and enabling a monitor mode for the wireless communications transceiver; a detection circuit for detecting sensory data signals originating from a monitored area when the monitor mode is enabled; a set of selectable monitor mode control options within a control menu presented on a display of the wireless communications transceiver, which options include a user selectable predetermined threshold required for an alert to be triggered; and an alert generator circuit for generating an alert when the sensory data exceeds the user selectable predetermined threshold and when the monitor mode is enabled. The sensory data signals are processed by the communications transceiver and can be transmitted, at least during certain portions when the monitor mode is enabled, over a time-delay sensitive wireless communications channel used by the transceiver for transmitting voice data signals.

In a preferred embodiment, the alert is transmitted over a non-delay sensitive communication channel. Conversely, the time-delay sensitive wireless communications channel uses an FDMA, TDMA or CDMA signal protocol.

The transceiver can include a monitor status display for communicating a status of the monitored area, including a presence of a received alert. In some applications, the sound detection and analysis intelligence is incorporated in a remote server. An operator of the wireless communications transceiver can adjust the predetermined threshold to an amplitude level and an overall activity energy which must be met by the sensory data signals before the alert is generated. Typically the sensory data signals correspond to sound signals originating from the monitored area, but can also be other types of information (video).

A related aspect of the invention concerns a cellular telephone which includes an integrated monitoring circuit and comprising: a setup circuit for configuring and enabling a monitor mode for the wireless communications transceiver; a detection circuit for detecting sensory data signals originating from a monitored area when the monitor mode is enabled; and an alert generator circuit for generating an alert when the sensory data exceeds a predetermined threshold when the monitor mode is enabled. The set up circuit, the detection circuit and the alert generator circuit are implemented in part by sharing a digital signal processor (DSP) and a firmware memory which are also used by the cellular telephone for communications tasks associated with receiving and transmitting voice and data signals over a wireless communications channel. A transmission circuit transmits the sensory data signals and the alert to a remote transceiver. The sensory data signals are processed by the DSP and transmitted over a voice wireless communications channel used by the transceiver for transmitting voice data signals, and the alert is transmitted over a separate lower bandwidth communications channel. Again, in some applications a sound template memory is presented in the cellular phone for storing a specific sound which must be identified and recognized in the monitored area by a shared speech recognition unit within the cellular telephone before generating an alert.

Another aspect of the invention concerns a personal digital assistant (PDA) which includes a wireless transceiver communications capability and an integrated monitoring circuit, and comprising: a setup circuit for configuring and enabling a monitor mode for the PDA; a detection circuit for detecting sensory data signals originating from a monitored area when the monitor mode is enabled; a journaling circuit for storing a predetermined monitoring session of data sensory signals; and an alert generator circuit for generating an alert when the sensory data exceeds a predetermined threshold when the monitor mode is enabled. The set up circuit, the detection circuit and the alert generator circuit are implemented in part by sharing a digital signal processor (DSP) and a firmware memory which are also used by the PDA for communications tasks associated with receiving and transmitting voice and data signals over a wireless communications channel. A transmission circuit for transmitting the sensory data signals and the alert to a remote transceiver is also included. The sensory data signals are processed by the DSP and transmitted over a voice wireless communications channel used by the PDA for transmitting voice data signals.

Still another aspect of the invention is directed to a method of remotely monitoring an area using a wireless communications transceiver comprising the steps of: configuring and enabling a monitor mode for the wireless communications transceiver; specifying monitor mode control options within a control menu presented on a display of the wireless communications transceiver, which options include a user selectable predetermined threshold required for an alert to be triggered; detecting sensory data signals originating from a monitored area when the monitor mode is enabled; and generating an alert when the sensory data exceeds the user selectable predetermined threshold and when the monitor mode is enabled. The sensory data signals are processed by the communications transceiver and are transmitted, at least during certain portions when the monitor mode is enabled, over a time-delay sensitive wireless communications channel used by the transceiver for transmitting voice data signals.

In certain embodiments further steps are performed, such as: transmitting the sensory data signals on a continuous basis to a second transceiver in a first communications session, and initiating a second communications session automatically in the event of a failure in the first communication session. As noted above, in some instances the sensory data signals (and/ or alert) can be routed by a wireless carrier along with other subscriber-related data from a wireless service provider to a second transceiver. The subscriber-related data can include e-mail and/or advertising. In some applications a channel used for transmitting the alert is subject to time delays.

In still other applications ringing features of the wireless communication transceiver are automatically disabled when it is set to a monitor mode. The sensory data signals can be stored in some cases at an Internet service provider server during at least portions of the monitor mode.

Another aspect of the invention concerns a method of remotely monitoring an area using a wireless communications transceiver comprising the steps of: configuring and enabling a monitor mode for the wireless communications transceiver for a subscriber; detecting sensory data signals originating from a monitored area when the monitor mode is enabled; generating an alert to the subscriber when the sensory data exceeds a predetermined threshold when the monitor mode is enabled; transmitting the alert over a wireless communications channel and to a communications link controlled by an Internet server; and combining the alert with additional information provided by the Internet server relating to the subscriber and communicating the same to a second wireless communications transceiver.

It will be understood from the Detailed Description that the inventions can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions. While described in the context of a baby monitoring system, it will be apparent to those skilled in the art that the present teachings could be used in any remote monitoring application.

DETAILED DESCRIPTION

Figure 1:
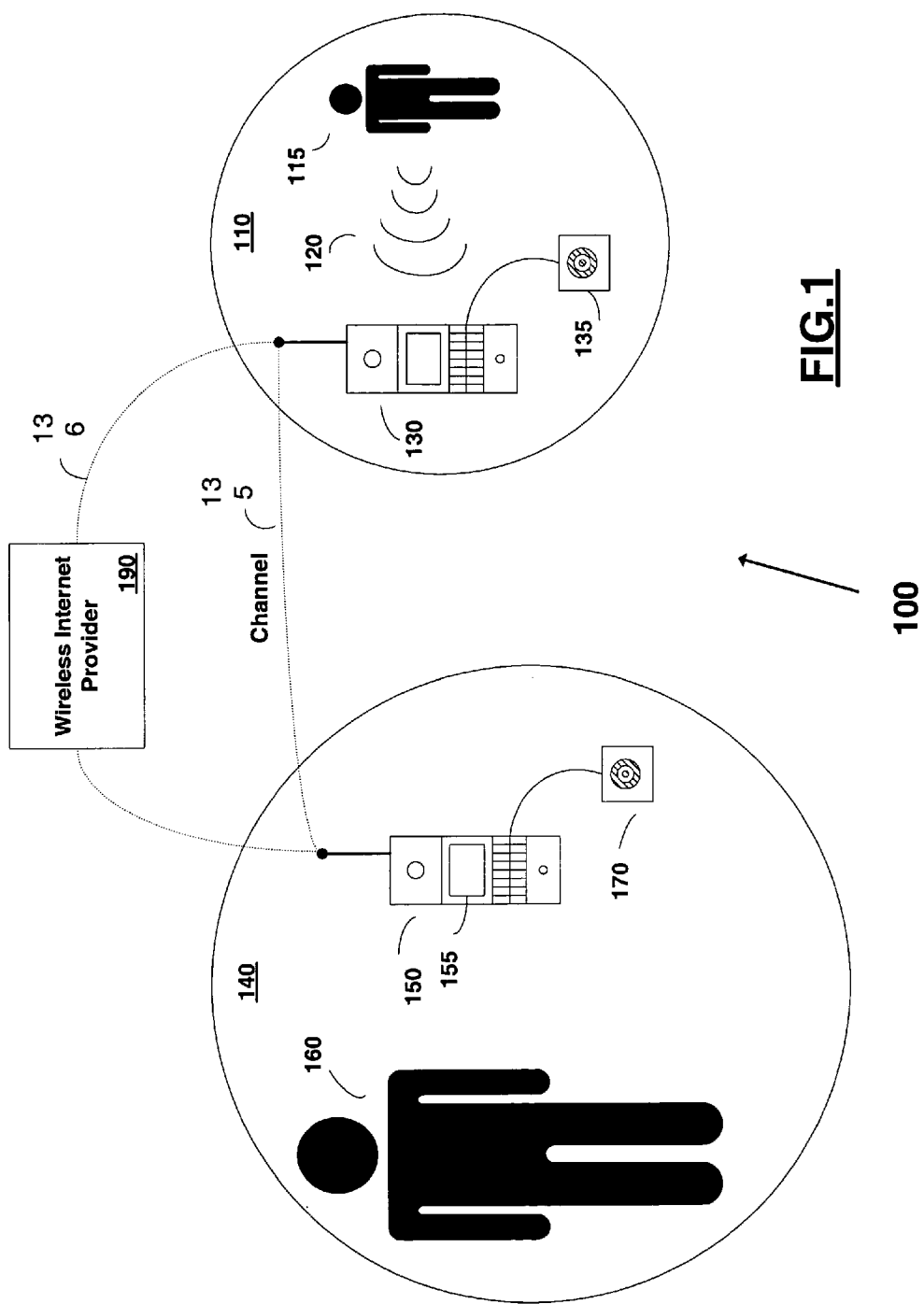
FIG. 1 is a diagram illustrating a monitoring system implemented in accordance with one exemplary embodiment of the present invention.

A preferred embodiment of a long range monitoring system (hereinafter "monitoring system") 100 of the present invention is illustrated generally in FIG. 1. By "long range" in this instance it is meant that the overall communications channel from end to end utilizes at least one link that is not limited by an RF distance range, even though some RF links may be used for intermediary links. Thus, the overall range of the present invention extends significantly beyond that afforded by conventional solutions.

Monitor area 110 corresponds to an area which must be monitored for activity, such as images, sound, video, etc., associated with an entity 115. In a preferred approach, entity 115 is a small child who may be sleeping or engaging in some other activity which may require some measure of supervisions. Often a parent or other guardian who leaves the vicinity of monitor area 110 will nonetheless wish to be alerted when such child wakes, cries, is distressed, etc. The child or other entity thus generates sensory data (e.g., a sound signal) 120 which is captured by a transceiver 130.

Transceiver 130 is preferably a cell phone, a personal digital assistant, or some other small portable communications device which, in contrast to the prior art, is capable of both receiving and transmitting a communications signal, and which has been adapted to include an integrated monitoring functionality as noted below. Moreover transceiver 130 is preferably self-powered (battery or other means) so that it does not have to be used in area that includes a source of electricity. Thus, unlike prior art systems, the invention does not require a setup, purchase or use of other monitoring equipment that may be difficult to implement in any particular monitor area. For instance, it is not practical or possible to use conventional monitoring devices in the wilderness or other remote areas, where an infant may be sleeping, for example, in a tent. In other cases, it is impractical to bring along such equipment when visiting other persons, or when staying at other accommodations away from one's home—such as motels, hotels, etc. The use of a transceiver with integrated monitoring functionality avoids almost all of these problems, since cell phones are already widely adopted in the population, and the areas of coverage are almost ubiquitous.

Again, other sensory data signals may be received by a transceiver 130, such as video, still images, and other area-related sensory data, such as temperature, humidity, and even signals related to detections of certain chemicals (i.e., smoke, carbon monoxide, etc.). For example, certain types of electronic chemical "nose" integrated circuits are known in the art, and could be integrated into a transceiver.

An optional speaker 135 can also be connected to communicate sound or other data feedback back to the monitor area 110.

Signal 120 is then communicated by transceiver to one or more communications channels which may include, for example a wireless channel 135 to be routed by a wireless service provider (such as AT&T) or a wireless channel 136 to be routed by a wireless Internet service provider 190. Regardless of the path taken, the signal information from the monitor area 110 is then preferably wirelessly transmitted to a reception/detection area 140.

At this location it is then received by a transceiver 150, which is preferably (but not necessarily) adapted in the same way as transceiver 130 to include a monitoring function. Transceiver 150 may include a display area 155 for observing monitoring information, as well as a separate speaker 170 for reproducing sound originating and relayed from monitor area 110.

Transceiver 150 is used by an observer 160, which, again, is typically a person but which could be another form of electronic guardian in other applications. In some applications, transceiver 150 may be simply a conventional cell phone, PDA or other communication device that is not adapted to have a monitoring transmitting or reporting capability. In other words, the monitoring information relayed from transceiver 130 may be picked up by a conventional cell phone, and the observer 160 could simply listen using a conventional earphone piece. Therefore, it is only necessary to have the transmitting transceiver 130 adapted with the present invention. This allows for mixing and matching of different types of communicators from different manufacturers, and eliminates the need to have two identical devices.

Figure 2A:
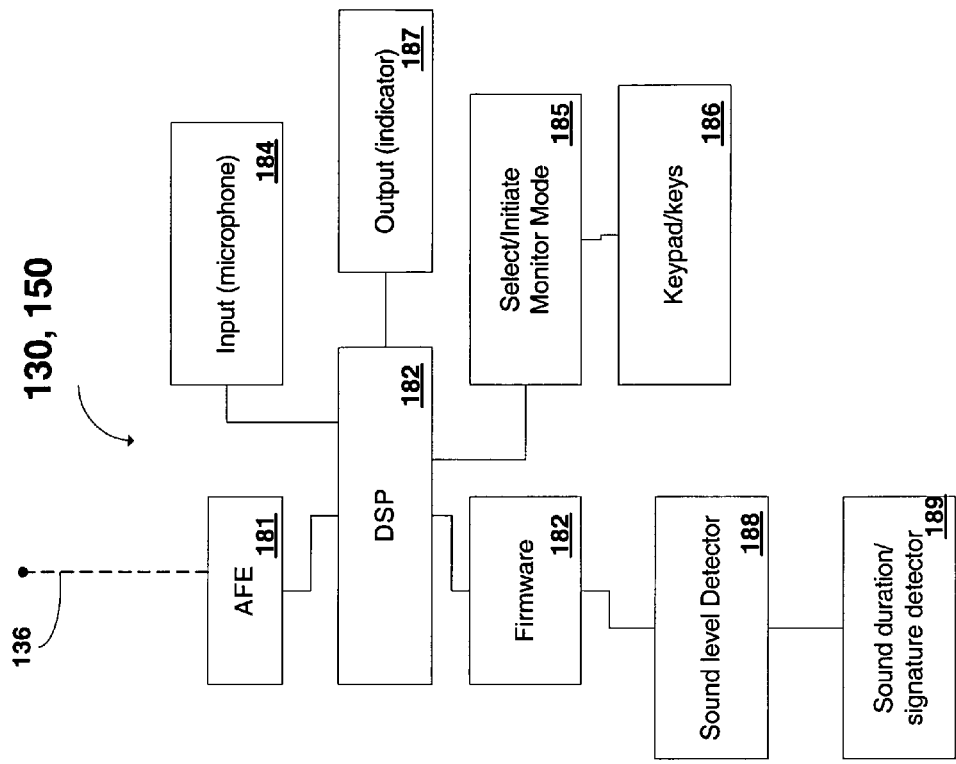
FIG. 2A illustrates an embodiment of a monitoring receiver/transmitter of the present invention.

A block diagram of a monitoring circuit 180 is shown in FIG. 2A, which, as noted earlier, is integrated within transceiver 130, and optionally within transceiver 150 as well. An antenna 136 receives/transmits conventional wireless signals routed by a wireless carrier over a wireless channel. These signals may be based on a TDMA, FDMA, CDMA or similar wireless communications protocol. These signals are then converted by an analog front end circuit 181, where they are converted to digital form and processed by a digital signal processor 182. DSP 182 operates in accordance with programmed firmware 183, which may be a memory integrated within DSP 182, or may be part of a separate programmed memory such as ROM or Flash. An input device (typically a microphone) 184 is used to provide audio/video data from a user of transceiver 130 to be communicated back over the channel by antenna 136. All of the above elements are well-known conventional components of a cell phone (or PDA that includes wireless communications capability) and thus the details are not described here.

The present invention is integrated into a first transceiver 130 by virtue of the following components. First, a monitor selection circuit 185 is used to enable and configure a monitoring mode for first transceiver 130. The monitor selection circuit 185 is engageable by a user through a selection of keystrokes entered on keypad 186. Keypad 186 may be a conventional keypad for a cell phone, or could be a set of separate dedicated keys for a monitoring function. For example, most cell phones include an electronic programming menu and memory for activating and changing behavior of a device, including with such features as altering a ringing behavior, adjusting a time display, entering a phonebook of speed dial numbers, etc. The present invention, therefore, could be simply identified as another menu selection item on a setup feature of a cell phone.

The monitoring mode could thus be enabled and initiated either through a set of keystrokes on a conventional keypad, or it could be triggered in response to a dedicated additional key or button on the front or side of a conventional transceiver. Regardless of how the monitoring mode is activated, it is thereafter controlled by additional routines contained within control firmware 183. Thus the monitoring features, operations, etc., are preferably integrated within a common firmware control memory that is used for conventional communications functions. This again, serves to reduce the cost of implementing a monitoring feature.

The monitoring mode circuit 180 includes two additional functions implemented (preferably) in firmware, namely signal level detector 188 and signal duration (or even signal recognition) detector 189. The operations of these two routines is explained further below.

Another component of monitoring mode circuit 180 is a monitor mode indicator circuit 187. The latter is used, for example, to indicate the status of a monitoring mode, such as, for example, whether the latter is on or off. Thus, this circuit could be as simple as a single light emitting diode (LED) to signify that a monitoring mode is active. In other instances, the indicator circuit could be integrated as part of the display unit of the cell phone or PDA, again, to reduce expense and size. Accordingly, it will be understood that the monitoring mode functions/status indicators could be integrated, presented and displayed on an existing display of a conventional communications device, using a customized monitor "indicator" of some form. The monitor mode indicator could be expressed as a symbol, a phrase, etc. Other examples will be apparent to those skilled in the art.

While enabled in a monitoring mode, transceiver 130 picks up sensory data from monitored area 110 and transmits the same (either continuously or intermittently) to second remote transceiver 150. Again, to improve integration and reduce costs, the sensory data signals originating from the monitored area are processed, transmitted and routed over a wireless channel in the same fashion as is done for conventional voice data signals originating from transceiver 130. In a simplified scenario, for example, the transceiver behaves like an always-on speaker phone transmitting continuously over a voice data channel to the second transceiver as if a conversation were ongoing during the entire monitoring time period.

Figure 2B:
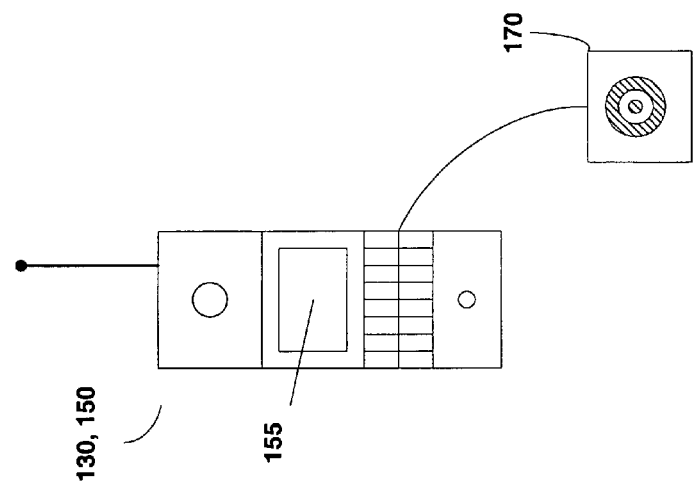
FIG. 2B is a block diagram of a monitoring circuit which can be implemented as part of a PDA or a cell phone in accordance with one exemplary embodiment of the present invention.

A simplified perspective of the structural and visual appearance of transceivers 130, 150 is shown in FIG. 2B. It should be noted, of course, that first transceiver 130 could have a similar if not identical appearance. A receiving transceiver, however, preferably has an indicator 155 for displaying monitored signal status information originating and received from the monitored area. Again, however, this indicator could be part of a display area integrated within a conventional display. The indicator 155 could be as simple as merely turning a conventional display on/off, to signify the detection of a significant sound event at monitored area 110, so that an observer 160 would be alerted to pick up the transceiver and listen for the signal being received. Other variations for a monitor signal status indicator 155 will be apparent from the present disclosure.

Speaker 170 is shown separately, because it is preferably a powered system of some kind that can amplify a received signal from the monitored area. The use of a speaker with a conventional transceiver may obviate the need for a second transceiver which is adapted to include a monitor signal status indicator.

Figure 3:
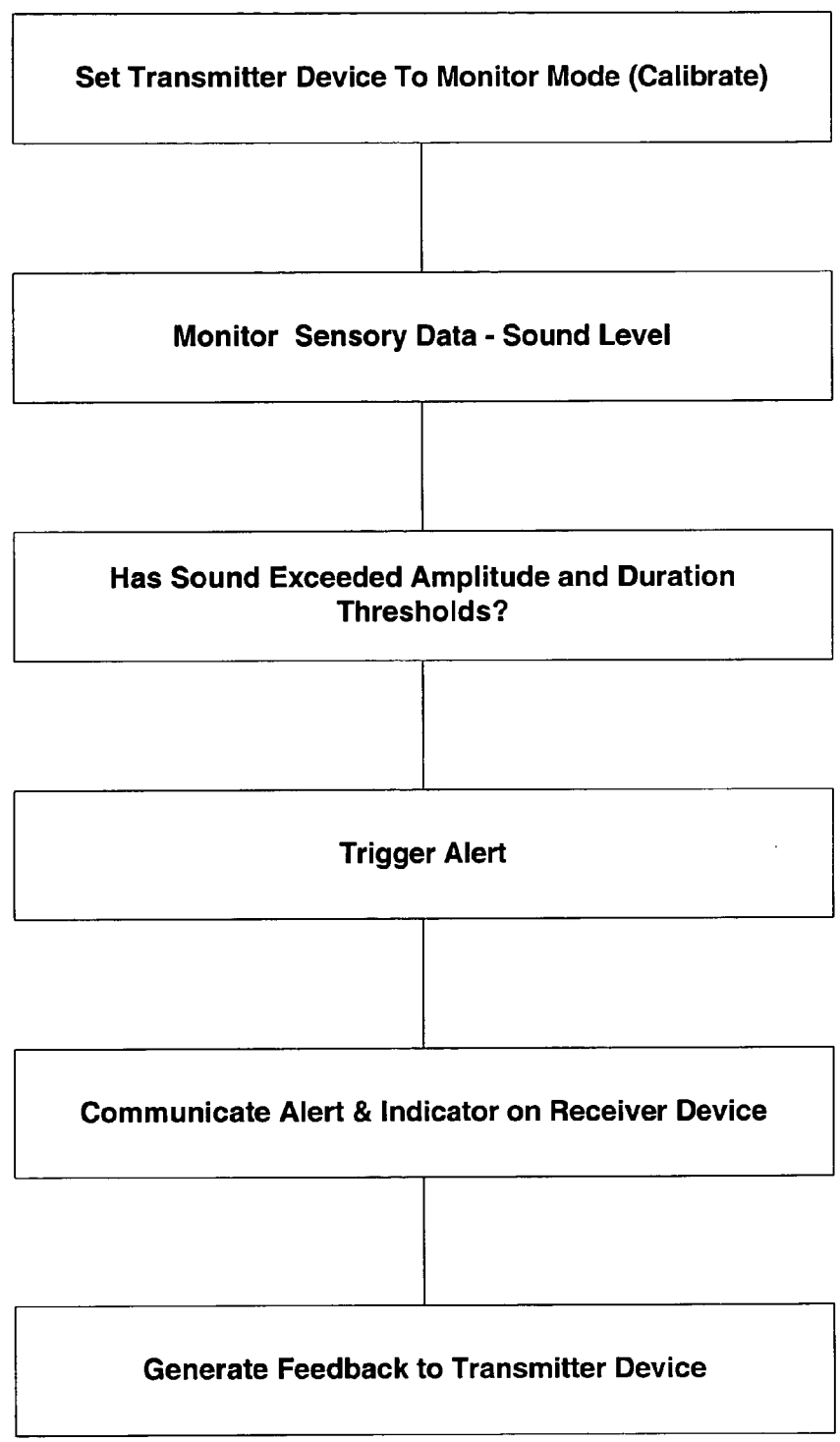
FIG. 3 is a flow chart illustrating the steps performed by a monitoring system of the present invention.

A preferred monitoring process 300 practiced by embodiments of the claimed invention is shown in a flow chart form in FIG. 3. It will be understood by those skilled in the art that a variety of conventional electrical circuits, firmware, etc. of a conventional cell phone and/or PDA can be modified and/or augmented to perform these tasks, and that the actual implementation will vary from platform to platform.

Thus, as seen at step 310, a first step is to set a first transceiver 130 to a monitor mode within a monitor area 110. The monitor mode may be enabled and configured as noted earlier. As part of this step, an additional optional calibrating step may be implemented. During such time, a user can determine and set a sensitivity rating of a first transmitting transceiver and a second receiving transceiver, to ensure that target sound activities within the monitoring area result in an alert to the second receiving transceiver.

In yet another variation, a user can record a child's voice print, a child's cry, or some other sound event to be stored in the form of a digital sound template on the transceiver within the same memory noted earlier for firmware 183—i.e., a flash memory. The sound template can then be used later to confirm a match to a sound analyzed by a sound recognition detector within the transceiver to generate an alert. Since many cellphones are expected to be equipped with a speech recognizer, this again allows for a dual use of such technology, including as part of a monitoring system. Finally, the user then also specifies a calling number, or other ID of a second transceiver which the first transceiver will communicate with, and thus treat as the observer for the monitoring activities.

Step 320 occurs while the area of interest is being monitored, and the user has left the first transceiver 130 in place to observe activities of the monitored area 110. An overall sound level of the monitored area is thus registered at step 320 in response to a sound event, under control of sound level detector routine 188 as noted above. This sampling may be performed continuously, or on an intermittent basis periodically to save power.

At steps 330 and 340, a series of determinations are made by sound event evaluator 189 in response to the sound event. For example, only sound events above a certain threshold should trigger an alert, to avoid generating excessive false alarms. Similarly, only sound events longer than a certain duration, or meeting an overall energy level, or matching a stored and recognized sound template, should be registered as sufficiently noteworthy for generating an alert. All of these parameters, again, can be set during the setup of a monitor mode selection circuit 185, or a later time at transceiver 150 in response to feedback suggesting that they are not set appropriately for a particular setting.

It should be apparent that these settings will vary according to the type of event being detected, and the type of sensory data being monitored. In the context of a video based sensory data monitor, an observer would likely wish to be informed of changes in the image, but only as a result of significant movement. For example, the observer may wish to be alerted when a child has changed from a sleeping position to a sitting up position. Other examples will be apparent to skilled artisans. The system could be programmed to ignored smaller movements, such as a child rolling over on one side. Again, the degree of movement could be calibrated as desired, and the degree of image activity and/or change from frame to frame could be monitored and evaluated using any of a variety of known techniques to determine if a trigger event has occurred.

At step 350, assuming the sound event (or other detected activity) exceeds the established threshold, an alert event is then triggered. The alert could include one or more of the following activities: (1) placing a call to the second transceiver to cause the latter to generate a ringing sound; (2) sending an audible control signal, tone, etc. from first transceiver 130 to second transceiver that can be detected by a human observer in detection area 140, either directly or through amplification with speaker 170; (3) sending a non-audible control signal from first transceiver 130 to second transceiver 150 to cause a monitor status indicator 155 to change state in a manner that can be identified by an observer 160. Other types of alerts and indicators will be apparent to those skilled in the art.

Thus, at step 360, depending on the form of indicator selected, the alert is then communicated to the second transceiver 150. The alert can be sent over a conventional communications channel used by the cell phone, or a special control channel that may be reserved by a wireless carrier for such purpose. In other words, since an alert is an extremely low bandwidth requirement event, and does not require a real-time, full duplex channel, it can be handled by a wireless carrier using a variety of secondary communications channels that do not impact normal voice traffic, and which are relatively inexpensive. For example, the alert could be sent over a pager type UHF network, and/or over a wireless message network connection (such as WAP) to the transceiver. The alert could consist of a specialized message, text, sound, etc. As part of the alert, the first transceiver could also place a direct call to the second transceiver to establish a direct end to end link from the monitor area to the observer area. This approach has the benefit of not tying up either transceiver for regular voice/data communications.

In at least some embodiments it may be preferred nonetheless that the two transceivers maintain a continuous communications channel. This is useful in those situations where an observer desires to constantly monitor a triggering event quickly and directly to evaluate the received information. In other words, an observer may want to hear the sound event (or see the video image) directly to see if a child has actually woken up, the level of distress which the child is exhibiting, etc. The sensory data from the monitored area, in this instance, is treated as time sensitive data, and is thus preferably directly transmitted over the same type of wireless communication channel normally used for voice/data traffic by the transceiver.

At step 370, an observer can send feedback information back from second transceiver 150 to first transceiver 130. This can be used, for example, to communicate soothing sounds by a parent to a child through speaker 135 before the parent can return and attend to the child directly. Other uses for the feedback will be apparent.

From the above it is apparent that a monitoring function can be easily integrated into a conventional cell phone or PDA to increase the functionality of the latter at very little cost. In some cases the transceivers may be inexpensive standalone units that are given to patrons of a resort facility to assist in monitoring their children in lieu of a cell phone.

If the monitoring mode is set to a continuous transmission mode, and there is a disruption (drop-off) in a communications channel, the first transceiver 130 can be programmed to auto- and repeat dial until it re-establishes a connection. The drop off event can also be communicated using the monitor signal status indicator 155 for the benefit of the observer 160.

In the case where an intermediary Internet based routing link is used through an Internet provider 190, additional information (aside from the trigger event) may be communicated to an observer. For example, e-mail, advertising or other similar subscriber information could be presented by a wireless carrier along with the monitoring information to second transceiver 150, based on activating a monitor mode between transceiver units.

Furthermore, when set to a monitor mode, a transceiver may selectively disable other features automatically, such as ringing, call waiting, etc., so as to not interfere with the monitor area ambient conditions, or the monitoring functions. The transceiver 130 returns to normal, or otherwise specified default settings in response to the de-activation of the monitor mode.

During a monitor mode setup, the devices can also be set to enter a monitor mode automatically after a first user defined period of time, and to shut off automatically after a second period of time has elapsed. In other words, the monitor mode could be set to start at 6:00 p.m., and to run for 2 hours. Other variations will be apparent to those skilled in the art. This feature would allow a person to use the invention to (re-motely) attend a business meeting at a later time for example, by leaving the transceiver in a conference room or other designated meeting area. When the transceiver enters the monitor mode, it automatically sets up a communications channel and link for the specified duration to a predetermined second transceiver. As noted earlier, a journaling feature might be used with the cooperation of an Internet Service provider to help record business and personal conversations without having to rely on bringing an additional recorder to a meeting.

In other instances it may be desirable to "journal" the sound activity (or video activity as the case may be) from the monitor area 110 for archiving purposes. Since many ISPs now provide extensive data storage facilities for subscribers, the monitoring information could be stored directly on an Internet server to obviate the need for local storage on a small transceiver.

Finally, in some instances the sound event capture/comparison/recognition operations could be performed instead by a wireless internet provider 190. In other words, one more target sounds to be detected and recognized (for example a child's cry, a child's voice, etc.) could be stored in a template on an wireless accessed internet server. During a monitoring session, the sounds from the monitoring area could be continuously compared to such target sound templates to recognize a particular event and verify a match. This avoids having to allocate storage space on the transceivers for the sound profiles, and/or the sound matching activities. In such cases the transceiver could essentially act as a passive listener while the sound processing intelligence resides on a wireless online service provider.

While the present invention is presented in the context of monitoring sound activities by children, other uses will be apparent to those skilled in the art. The invention can be employed in a wide variety of applications to support remote monitoring using cell phones, PDAs and similar communications devices, and without requiring dedicated and expensive detection equipment on both sides of a monitoring link.

The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of reporting activity associated with a first user and implemented on a first cellphone comprising the steps of:
    (a) providing detection control options on the first cellphone, which reporting control options include:
        i. data reporting controls selectable by a user of said first cellphone for identifying reporting data to be reported for the first user; and
        ii. an option for enabling said data reporting temporarily for the first user during a specified monitoring period, which specified monitoring period lasts for a first designated duration; and
        iii. identification data for at least one second user designated by the first user to receive said data reporting for the first user;
    (b) receiving data specifying a monitoring period during which said first cellphone can communicate said reporting data for the first user;
    (c) processing said reporting data and causing at least selected portions of said reporting data to be communicated to a second cellphone identified for the at least one second user;
    (d) wherein said reporting data can be displayed within a selected portion of a graphical interface of said second cellphone of said at least one second user;
        wherein said detection control options authorize the second user to receive said reporting data over a first communications channel which is separate from a second communications channel used by the second cellphone to receive voice data signals.

2. The method of claim 1, further including a step: (e) journaling said reporting data at an Internet server computing system.

3. The method of claim 1, further including a step: (e) journaling said reporting data at said first cellphone.

4. The method of claim 1 wherein said reporting data is sent by said first cellphone only intermittently during said specified monitoring period.

5. The method of claim 1 wherein said reporting data is sent continuously.

6. The method of claim 1, wherein other data including e-mail and/or advertising are communicated to said second cellphone along with said reporting data.

7. The method of claim 1, wherein said reporting data originates from an area being monitored in a vicinity of the first cellphone.

8. The method of claim 1, wherein said reporting data is associated with movements by a person within an area monitored by said first cellphone.

9. The method of claim 1, wherein sensory data from a monitored area in the vicinity of said first cellphone is sent to said second cellphone, including one of a sound, an image or a video.

10. The method of claim 1, wherein sensory data associated with the first user is sent to said second cellphone with an alert, including one of a sound, an image or a video.

11. The method of claim 1 wherein said first cell phone can be configured to enable said reporting data to be detected and presented while said first cellphone is executing other voice communications related functions.

12. The method of claim 1 further including a step: initiating a voice call between said second cellphone to said first cellphone in response to an alert determined for said reporting data.

13. The method of claim 1 wherein said status information presented on said second cellphone indicates a disruption or loss of a communications link between said second cellphone and said first cellphone.

14. The method of claim 1 further including a step performing speech recognition on said reported data.

15. A method of reporting activity associated with a first user and implemented in part on a first cellphone comprising the steps of:
   (a) providing detection control options on the first cellphone, which reporting control options include:
      i. data reporting controls selectable by a user of said first cellphone for identifying reporting data to be reported for the first user; and
      ii. an option for enabling said data reporting temporarily for the first user during a specified monitoring period, which specified monitoring period lasts for a first designated duration; and
      iii. identification data for at least one second user designated by the first user to receive said data reporting for the first user;
   (b) receiving data specifying a monitoring period during which said first cellphone can communicate said reporting data for the first user to an Internet server computing system;
   (c) processing said reporting data at said Internet server computing system to transmit at least selected portions of said reporting data to a second cellphone identified for the at least one second user;
   (d) wherein said reporting data from the Internet server computing system can be displayed within a selected portion of a graphical interface of said second cellphone of said at least one second user;
      wherein said detection control options permit the second user to receive said reporting data over a first communications channel which is separate from a second communications channel used by the second cellphone to receive voice data signals.

16. The device of claim 15, wherein speech data is detected in said monitored area and recognized by a shared speech recognition unit within said first cellphone.

17. A communications device adapted to report activities associated with a first user comprising:
   (a) a first routine executing on a first cellphone and adapted to enable reporting control options including:
      i. data reporting controls selectable by a user of said first cellphone for identifying reporting data to be reported for the first user; and
      ii. an option for enabling said data reporting temporarily for the first user during a specified monitoring period, which specified monitoring period lasts for a first designated duration; and
      iii. identification data for at least one second user designated by the first user to receive said data reporting for the first user;
   (b) a second routine executing on said first cellphone and configured to communicate at least selected portions of said reporting data for the first user during said specified period to a second cellphone identified for the at least one second user;
      wherein said reporting data can be displayed within a selected portion of a graphical interface of said second cellphone of said at least one second user;
      wherein said detection control options authorize the second user to receive said reporting data over a first communications channel which is separate from a second communications channel used by the second cellphone to receive voice data signals.

18. The device of claim 17 wherein reporting data can be journaled at an Internet server computing system.

19. The device of claim 17 wherein said reporting data can be journaled at said first cellphone.

20. The device of claim 17 wherein said reporting data can be sent by said first cellphone only intermittently during said specified monitoring period.

21. The device of claim 17 wherein said reporting data can be sent continuously.

22. The device of claim 17, wherein other data including e-mail and/or advertising are communicated to said second cellphone along with said reporting data.

23. The device of claim 17, wherein said reporting data originates from an area being monitored in a vicinity of the first cellphone.

24. The device of claim 17, wherein said reporting data is associated with movements by a person within an area monitored by said first cellphone.

25. The device of claim 17, wherein sensory data from a monitored area in the vicinity of said first cellphone can be sent to said second cellphone with said alert, including one of a sound, an image or a video.

26. The device of claim 17, wherein sensory data associated with the first user can be sent to said second cellphone, including one of a sound, an image or a video.

27. The device of claim 17 wherein said first cell phone can be configured to enable said reporting data to be detected and presented while said first cellphone is executing other voice communications related functions.

28. The device of claim 17 wherein said second cellphone can inititate a voice call to said first cellphone in response to an alert determined for said reporting data.

29. The device of claim 17 wherein said status information presented on said second cellphone indicates a disruption or loss of a communications link between said second cellphone and said first cellphone.

30. A system for reporting activity associated with a first user and implemented in part on a first cellphone comprising:

(a) a first routine executing on the first cellphone and adapted to enable reporting control options including:
  i. data reporting controls selectable by a user of said first cellphone for identifying reporting data to be reported for the first user; and
  ii. an option for enabling said data reporting temporarily for the first user during a specified monitoring period, which specified monitoring period lasts for a first designated duration; and
  iii. identification data for at least one second user designated by the first user to receive said data reporting for the first user;
(b) a second routine executing on the first cellphone for communicating said reporting data for the first user to an Internet server computing system;
(c) a third routine executing at said Internet server computing system adapted to transmit at least selected portions of said reporting data to a second cellphone identified for the at least one second user;
wherein said reporting data from the Internet server computing system can be displayed within a selected portion of a graphical interface of said second cellphone of said at least one second user;
  further wherein said detection control options permit the second user to receive said reporting data over a first communications channel which is separate from a second communications channel used by the second cellphone to receive voice data signals.

* * * * *